(No Model.)
A. RAMMOSER.
MECHANISM FOR DETACHING THILLS.
No. 405,799. Patented June 25, 1889.
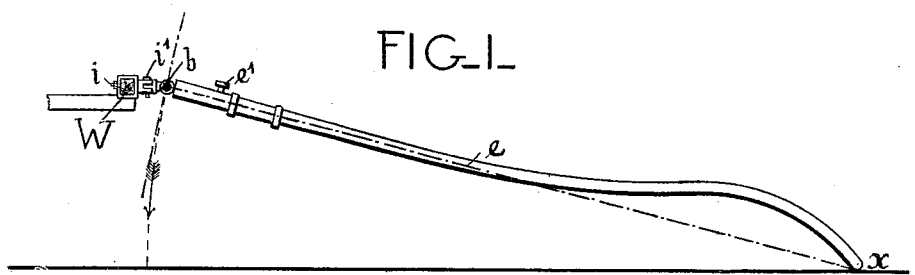
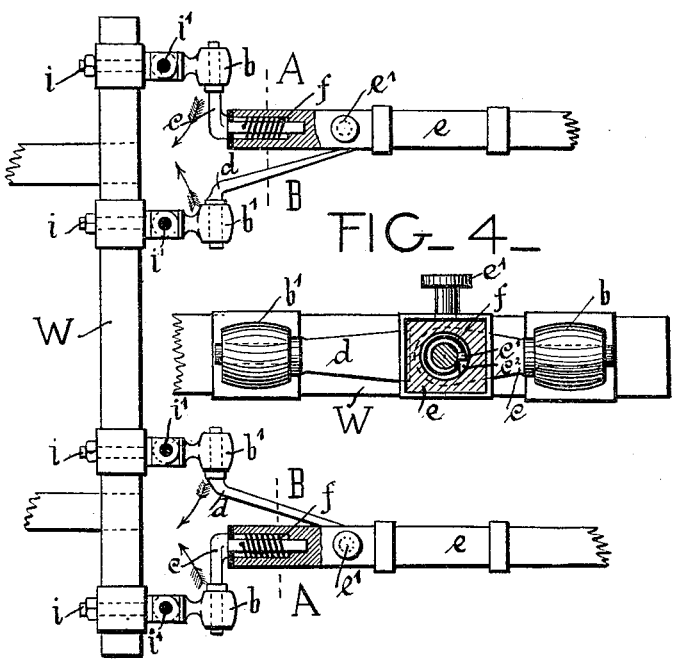
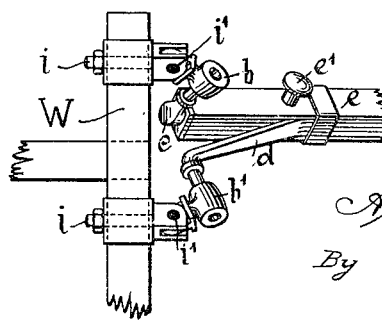
Witnesses:
H. de Vos.
E. L. Richards
Inventor:
Albert Rammoser,
By Richards & G.
Attorneys.

UNITED STATES PATENT OFFICE.

ALBERT RAMMOSER, OF BERLIN, GERMANY.

MECHANISM FOR DETACHING THILLS.

SPECIFICATION forming part of Letters Patent No. 405,799, dated June 25, 1889.

Application filed March 23, 1889. Serial No. 304,429. (No model.) Patented in Germany August 7, 1887, No. 42,666.

*To all whom it may concern:*

Be it known that I, ALBERT RAMMOSER, a subject of the German Emperor, King of Prussia, residing at Berlin, in the Kingdom of Prussia, German Empire, have invented a new and useful Mechanism for Detaching Thills and Poles from Vehicles, (for which I have obtained Letters Patent in Germany, No. 42,666, dated August 7, 1887;) and I do hereby declare that the following is a full, clear, and exact description of the same.

This invention relates to a means for automatically detaching the thills or pole from a vehicle in the event of the horse falling by the weight of the falling animal. The breaking of the thills is thereby prevented, and, moreover, the horse is not impeded by the thills or pole from getting onto its feet again.

The invention will be understood on reference to the accompanying drawings, in which—

Figure 1 is a side view. Fig. 2 is a top view. Fig. 3 is a perspective view of the mechanism at the moment the thills are disengaged. Fig. 4 is a section taken in the line A B of Fig. 2.

On the front beam W of the vehicle are four sockets $b$ $b$ $b'$ $b'$, attached thereto by means of swivel-shanks $i$ passing through the beam and secured by a nut. These sockets also rotate on a vertical axle $i'$. Two of these sockets $b$ $b'$ belong to each thill. The sockets $b$ $b$ engage with the pivoted ends of two rods or bars $c$, having a rotary motion in their places in the thills $e$, while the sockets $b'$ $b'$ engage with the pivoted ends of two rods or bars $d$, rigidly attached to the thills. The rods or bars $c$ are loosely arranged in the rear portion of the thills, so as to have a rotary motion at their places, and are maintained by a spiral spring $f$ in a horizontal position, as by the strain of this spring a lateral pin $c'$, arranged on the bar or rod, will bear against a shoulder $c^2$, arranged in the groove of the thills, Fig. 4.

As stated before, the rods or bars $d$ are rigidly attached to the thills.

When the horse falls, the forward portion of the thills are of course at first brought into contact with the earth, as represented in Fig. 1, and the falling horse will exercise a downward pressure on the thills. At the points where the thills are engaged—to wit, the sockets $b$ $b'$—the direction of this pressure is at right angles with a line $x$ drawn from the center of the sockets $b$ or $b'$ to the point where the thills touch the earth. In consequence of this direction of the pressure (see the arrow in Fig. 1) the rod or bar $c$ will be turned in such a manner that its pivoted end assumes an upward position, while the sockets $b$ and $b'$ will assume the positions represented in Fig. 3, rotating at the same time on their horizontal axles $i$ and their vertical axles $i'$. In this position, however, the pivoted ends of the rods or bars will immediately drop out of the sockets $b$ $b'$ and the thills fall down. Projecting knobs $e'$ are arranged on the thills for fastening the tugs.

Having now described my invention, what I claim as new, and desire to secure by Letters Patent, is—

The combination of a pole or thills with two lateral pivots $c$ and $d$, one of which $c$ has a rotary motion in its place in the thills, which pivots are inserted into two sockets $b$ $b'$, attached by means of swivel-shanks to the front beam of the vehicle and revolving at the same time on a vertical axle, substantially as and for the purpose herein shown and described.

In testimony whereof I have signed my name to this specification in the presence of two subscribing witnesses.

ALBERT RAMMOSER.

Witnesses:
   A. VOGT,
   B. ROI.